US009203827B2

(12) United States Patent
Srinivasan et al.

(10) Patent No.: US 9,203,827 B2
(45) Date of Patent: Dec. 1, 2015

(54) METHODS FOR DETERMINING AUTHENTICATION REQUIREMENTS OF INFORMATION CENTRIC NETWORK BASED SERVICES AND DEVICES THEREOF

(71) Applicant: Infosys Limited, Bangalore (IN)

(72) Inventors: Karthik Srinivasan, Bangalore (IN); Vijayaraghavan Varadarajan, Salem (IN); Rajat Arya, Meerut (IN)

(73) Assignee: Infosys Limited, Bangalore (IN)

( * ) Notice: Subject to any disclaimer, the term of this patent is extended or adjusted under 35 U.S.C. 154(b) by 76 days.

(21) Appl. No.: 14/220,389

(22) Filed: Mar. 20, 2014

(65) Prior Publication Data
US 2014/0380427 A1 Dec. 25, 2014

(30) Foreign Application Priority Data

Jun. 24, 2013 (IN) .............................. 2729/CHE/2013

(51) Int. Cl.
*H04L 29/06* (2006.01)
*H04L 9/08* (2006.01)
*H04L 9/32* (2006.01)

(52) U.S. Cl.
CPC ............... *H04L 63/08* (2013.01); *H04L 9/0813* (2013.01); *H04L 9/32* (2013.01); *H04L 29/06755* (2013.01); *H04L 63/0823* (2013.01)

(58) Field of Classification Search
CPC ... H04L 63/08; H04L 63/0823; H04L 9/0813; H04L 9/32; H04L 29/06755
See application file for complete search history.

(56) References Cited

U.S. PATENT DOCUMENTS

| 5,590,199 A | 12/1996 | Krajewski, Jr. et al. |
| 8,171,536 B2 | 5/2012 | Wagner et al. |
| 8,607,309 B2 * | 12/2013 | Ropolyi et al. ................... 726/3 |
| 2008/0313719 A1 * | 12/2008 | Kaliski et al. ..................... 726/5 |
| 2010/0269156 A1 * | 10/2010 | Hohlfeld et al. .................. 726/4 |
| 2011/0055545 A1 * | 3/2011 | Sovio et al. ................... 713/150 |
| 2013/0191887 A1 * | 7/2013 | Davis et al. ....................... 726/5 |

OTHER PUBLICATIONS

Ahlgren, B., "A Survey of Information-Centric Networking", Dagstuhl Seminar Proceedings 10492, pp. 1-26 (Feb. 2011).
Tateson, J., et al., "Final Evaluation Report on Deployment Incentives and Business Models", PSIRP Publish-Subscribe Internet Routing Paradigm FP7-INFSO-IST-216173, pp. 1-70 (Apr. 2010).

* cited by examiner

*Primary Examiner* — Krisna Lim
(74) *Attorney, Agent, or Firm* — LeClairRyan, a Professional Corporation

(57) ABSTRACT

A method, device, and non-transitory computer readable medium for determining and representing one or more authentication requirements for at least one valid service flow of one or more information centric network (ICN) based services. This technique involves capturing service specification and storing it in a repository. Then, one or more possible service flows are generated and represented based on the nature of contents, delivery options and preferred architecture. This representation is again modified based on the trust level among functional entities and authentication scope which are inferred from the service specification. The final representation of the service flow shows only the valid inter-connections and operations among functional entities and the service flow is constrained by authentication requirement.

21 Claims, 4 Drawing Sheets

METHODS FOR DETERMINING AUTHENTICATION REQUIREMENTS OF INFORMATION CENTRIC NETWORK BASED SERVICES AND DEVICES THEREOF

This application claims the benefit of Indian Patent Application Filing No. 2729/CHE/2013, filed Jun. 24, 2013, which is hereby incorporated by reference in its entirety.

FIELD

This technology generally relates to determining authentication requirements and, in particular, to methods for determining authentication requirements of Information Centric Network (ICN) based services and devices thereof.

BACKGROUND

In the ICN world there are multiple factors that contribute to challenges in evolving robust subscriber authentication schemes for services. These include architectural variations (centralized or de-centralized or hybrid, request-response, publish-subscribe and so on) which enable different mechanisms by which subscribers can retrieve content of their interest, trust levels between entities participating in an ICN network resulting in challenges related to assigning authentication or authorization responsibilities, availability of in-network caching, multipath, multicast delivery, packet level authentication and other network centric capabilities to optimize secure content delivery and finally evolving service sets i.e. the types of novel services that can be enabled in an ICN era is constantly evolving. Each of the above factors impacts how subscriber may be authenticated and gives rise to different threat models to be addressed by the possible solutions. Presently, there exists no formal mechanism to analyze a given ICN service and clearly elicit the requirements for authenticating subscribers for the service. This also creates challenges when it comes to verifying whether a given authentication solution meets all the requirements specific to the service.

SUMMARY

This technology overcomes all the limitations mentioned above by using a model that captures all the key entities participating in an ICN network and provides mechanism to effectively capture their interactions. Additionally, the model provides flexibility to support different architectural paradigm that are prevalent in the ICN. An objective of this technique is to formally represent the authentication requirements for a specific ICN service. Additionally, this technique extracts the constraints that need to be met by any authentication solution being designed for the service. Further, it provides mechanisms to elaborate potential threat models to be considered while designing the solution.

A method for determining and representing one or more authentication requirements for at least one valid service flow of one or more information centric network (ICN) based services is disclosed. The method includes capturing nature of one or more contents to be delivered as a part of the one or more ICN based services, one or more trust relationships, one or more authentication scope definitions and one or more content delivery options from an input service specification. After that, one or more possible service flows are represented based on the nature of the one or more contents and the one or more content delivery options, wherein the one or more possible service flows are extracted from a repository. Thereafter, a trust level between two or more functional entities involved in the one or more ICN services and an authentication scope of one or more users from the one or more trust relationships and authentication scope definitions are inferred. Further, one or more valid inter-connections and operations between the two or more functional entities are inferred based on the trust level and authentication scope. Finally, the at least one valid service flow is represented based on the one or more valid inter-connections and operations, wherein the at least one valid service flow is constrained by the one or more authentication requirements.

In an additional example, a system for determining and representing one or more authentication requirements for at least one valid service flow of one or more information centric network (ICN) based services is disclosed. The system includes a service specification module, a possible service flows representation module, a first inference module, a second inference module and a valid service flow representation module. The service specification module is configured to capture nature of one or more contents to be delivered as a part of the one or more ICN based services, one or more trust relationships, one or more authentication scope definitions and one or more content delivery options. The possible service flows representation module is configured to represent one or more possible service flows based on the nature of the one or more contents and the one or more content delivery options, wherein the one or more possible service flows are extracted from a repository. The first inference module is configured to infer a trust level between two or more functional entities involved in the one or more ICN based services and an authentication scope of one or more users from the one or more trust relationships and authentication scope definitions. The second inference module is configured to infer one or more valid inter-connections and operations between the two or more functional entities based on the trust level and authentication scope. The valid service flow representation module is configured to represent the at least one valid service flow based on the one or more valid inter-connections and operations, wherein the at least one valid service flow is constrained by the one or more authentication requirements.

In another example, a computer readable storage medium for determining and representing one or more authentication requirements for at least one valid service flow of one or more information centric network (ICN) based services is disclosed. The computer readable storage medium which is not a signal stores computer executable instructions for capturing nature of one or more contents to be delivered as a part of the one or more ICN based services, one or more trust relationships, one or more authentication scope definitions and one or more content delivery options from a input service specification, representing one or more possible service flows based on the nature of the one or more contents and the one or more content delivery options, wherein the one or more possible service flows are extracted from a repository, inferring a trust level between two or more functional entities involved in the one or more ICN based services and an authentication scope of one or more users from one or more trust relationships and authentication scope definitions, inferring one or more valid inter-connections and operations between the two or more functional entities based on the trust level and authentication scope and representing the at least one valid service flow based on the one or more valid inter-connections and operations, wherein the at least one valid service flow is constrained by the one or more authentication requirements.

BRIEF DESCRIPTION OF THE DRAWINGS

Various examples of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of this technology in order that the detailed description of the disclosure that follows may be better understood. Additional features and advantages of the disclosure will be described hereinafter which form the subject of the claims of the disclosure. It should be appreciated by those skilled in the art that the conception and specific example disclosed may be readily utilized as a basis for modifying or designing other structures for carrying out the same purposes of this technology. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of this technology.

Exemplary examples of this technology provide a system and method for determining and representing one or more authentication requirements for at least one valid service flow of one or more ICN based services. This technology receives an input specification which includes a set of information attributes that describe different aspects of an ICN service. Based on the service specification, the technique generates a directed graph that describes all possible service interactions or flows between different entities that form part of the ICN environment. It further specifies the nature of the interactions that can happen between different entities. This, along with the service specification authentication scope, describes the constraints that need to be met by any authentication solution being designed for the service. Further, this also helps in validating existing authentication solution's effectiveness for the specified service. In addition, the technique also outputs an inventory of possible threats for each possible interactions or flows.

Figure 1:
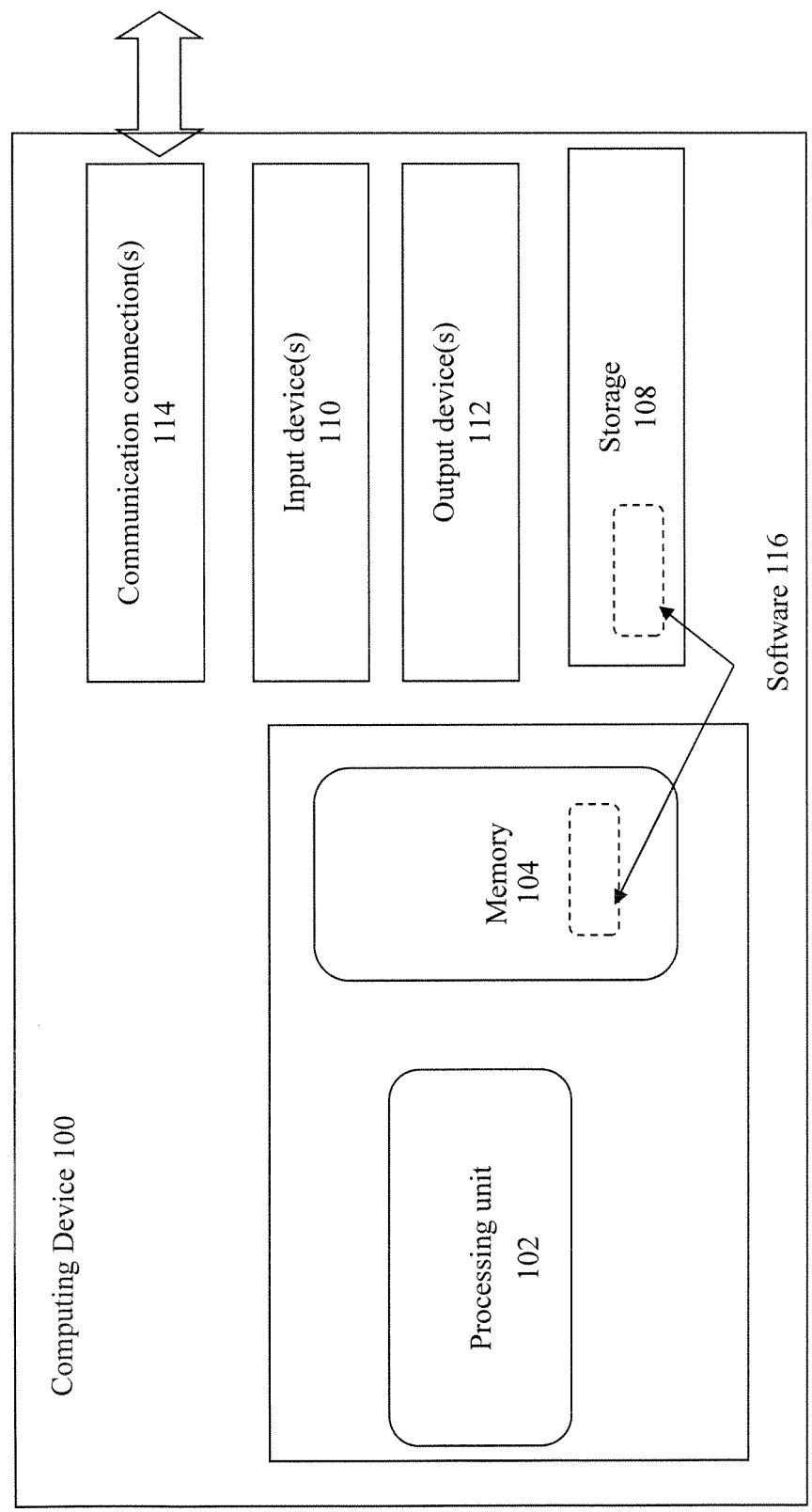
FIG. 1 is a computer architecture diagram illustrating a computing device capable of implementing the examples presented herein.

FIG. 1 illustrates a generalized example of a suitable authentication management computing device 100 in which all examples, techniques, and technologies of this invention may be implemented. The authentication management computing device 100 is not intended to suggest any limitation as to scope of use or functionality of the technology, as the technology may be implemented in diverse general-purpose or special-purpose computing devices. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like.

With reference to FIG. 1, the authentication management computing device 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. An authentication management computing device may have additional features. For example, the authentication management computing device 100 includes storage 108, one or more input devices 110, one or more output devices 112, and one or more communication connections 114. An interconnection mechanism (not shown) such as a bus, a controller, or a network, interconnects the components of the authentication management computing device 100. Typically, operating system software (not shown) provides an operating environment for other software executing in the authentication management computing device 100, and coordinates activities of the components of the authentication management computing device 100.

Figure 2:
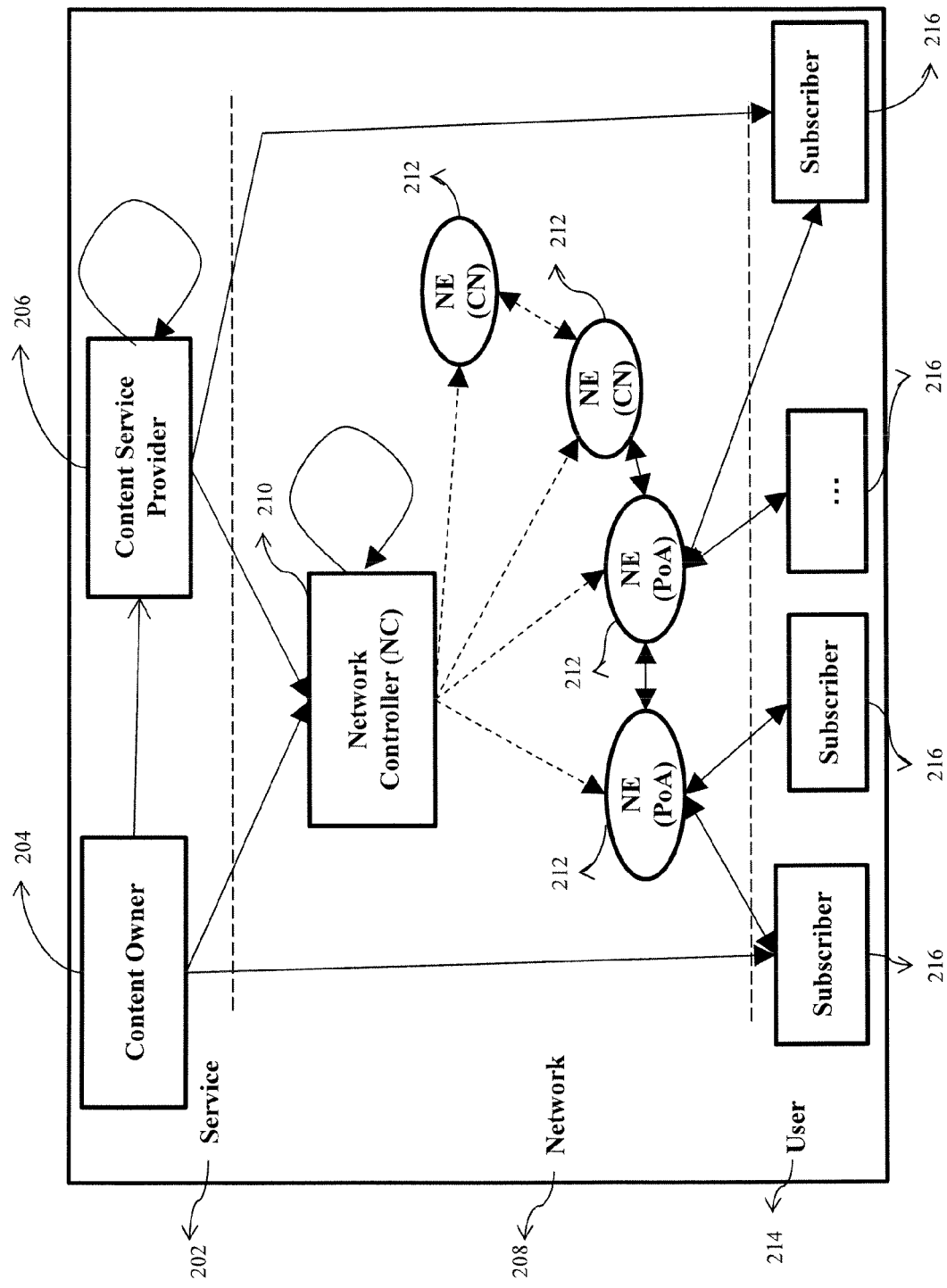
FIG. 2 depicts the different functional entities and an indicative set of interactions between them.

FIG. 2 depicts the different functional entities and an indicative set of interactions between them. The different functional entities involved in an ICN service are classified into three participatory domain—Service (202), Network (208) and User (214). Service (202) domain comprises of elements responsible for publishing content, offering content based services and authenticating subscribers to access related content. Service (202) in an ICN context mostly is offered in the form of access to specific content where the nature of content, its delivery and related attributes can vary widely. In various example of this technology, content can be static or dynamic, small or large, delay tolerant or latency bound. They can also be delivered to a single subscriber on demand or to a large number of subscribers simultaneously. Content can also be free or strongly authenticated. Examples of ICN services include but are not limited to access to freely published content, access to premium content based on subscriptions, aggregated access to content from multiple sources, subscription to content that is not yet published and content delivered to a large number of subscribers simultaneously in real time. Content owners (CO) (204) publish content, maintains information about subscribers interested in the content. Content service providers (SP) (206) offer content based services. In an alternate example, functions of CO (204) and SP (206) can be performed by the same entity. The SP (206) can maintain subscriber information on behalf of or independent of CO (204). Both the CO (204) and SP (206) can authorize other entities to authenticate subscribers and deliver content on their behalf. The CO (204) or SP (206) also specifies different network centric capabilities that can be leveraged for delivering their service over ICN networks. The network (208) is responsible for delivering content to authenticate subscribers. It may comprise of Network Elements (NE) (212) and network controllers (NC) (210). The NEs (212) perform one or more of the following basic functions—routing, forwarding and caching (CN). In addition, NEs (212) at the edge of the network, act as point of attachments (PoA) to subscribers (216). As a PoA, the NEs (212) may perform access control functions to allow only authenticated subscribers to attach to the network and access content services through it. The NC (210) is responsible for monitoring and management of the network. It can also act as a trusted entity responsible for managing the content distribution and delivery within its control scope. In a completely decentralized ICN model, there will be no NC (210) and in a completely centralized model, all requirements are likely to be routed through the NC (210). A hybrid model can selectively leverage NC (210) functionalities for specific class of services. Next, the User (214) domain comprises of subscribers (216) who are interested in accessing the services offered by the service domain. To access these services, they attach to the network through PoAs. Subscribers (216) may be authenticated to verify their identity and permissions to both connect to an ICN network as well as access specific services offered.

Figure 3:
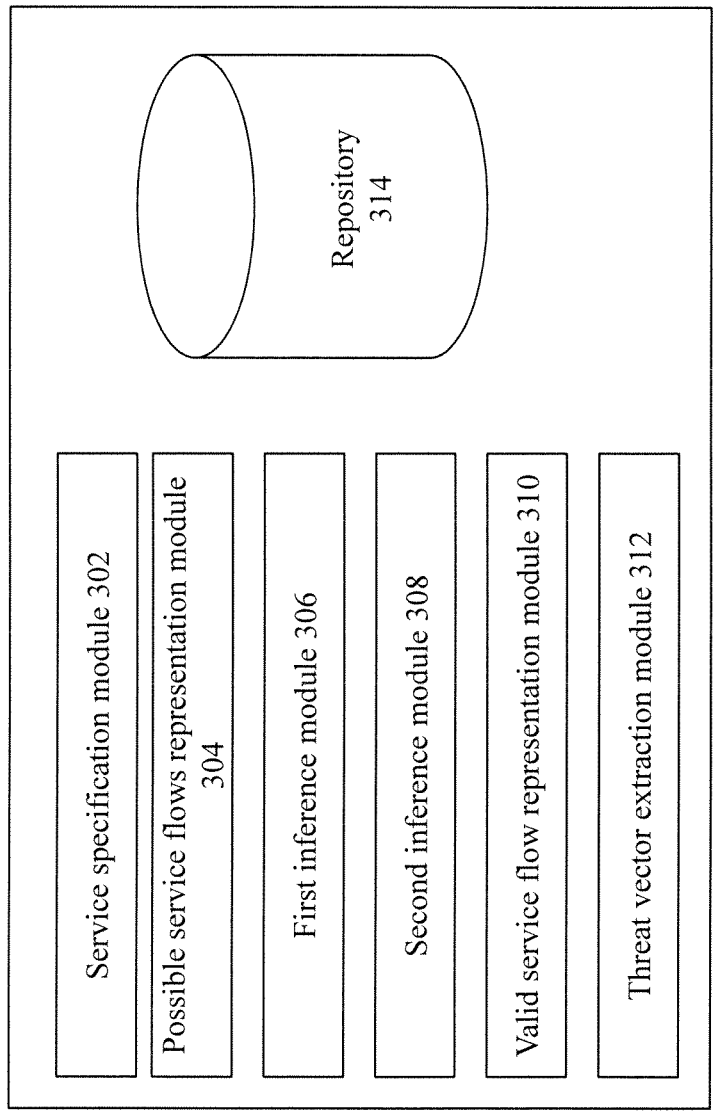
FIG. 3 is a block diagram illustrating modules of programmed instructions and a repository for determining and representing one or more authentication requirements for at least one valid service flow of one or more ICN based services, in accordance with an example of this technology.

FIG. 3 is a block diagram illustrating modules of programmed instructions and a repository in memory or other storage in computing device 100 for determining and representing one or more authentication requirements for at least one valid service flow of one or more ICN based services, in accordance with an example of this technology, although other types and/or numbers of modules, programmed instructions and/or data which may be stored in other internal and/or external locations may be used. In this example, the modules and repository includes a service specification module (302), a possible service flows representation module (304), a first inference module (306), a second inference module (308), a valid service flow representation module (310), a threat vector extraction module (312) and a repository (314). The service specification module (302) is configured to capture nature of one or more contents to be delivered as a part of the one or more ICN based services, one or more trust relationships, one or more authentication scope definitions and one or more content delivery options. Details regarding the service specification are mentioned herein below. The possible service flows representation module (304) is configured to represent one or more possible service flows based on the nature of the one or more contents and the one or more content delivery options. This can be represented as directed graph or as two dimensional matrices. The first inference module (306) is configured to infer a trust level between two or more functional entities involved in the one or more ICN based services and an authentication scope of one or more users from the one or more trust relationships and authentication scope definitions. The authentication scope includes individual authentication and scope level authentication. The second inference module (308) is configured to infer one or more valid inter-connections and operations between the two or more functional entities based on the trust level and authentication scope. The valid service flow representation module (310) is configured to represent the at least one valid service flow based on the one or more valid inter-connections and operations, wherein the at least one valid service flow is constrained by the one or more authentication requirements. The threat vector extraction module (312) is configured to extract one or more threat vectors from the repository based on the one or more valid inter-connections and operations. The repository (314) captures all possible interactions between the different functional entities that are part of the participatory domains. Interactions are represented as a sequence of operational verbs. In various examples of this technology, the various operations include publishing content description, publishing content, authorizing publication of description, authorizing publication of content, forwarding request, forwarding content, supplying content, authenticating scope, authenticating identity, authenticating rights. The repository (314) has the following information:

a) description of functional entities that are part of each of the domain across architectural paradigms;
    b) set of possible operations described as a collection of verbs between any two functional entities; and
    c) description of possible information flows (requests and data flow) depicted as directed graphs with associated sequence of operational verbs.

Internally, the above information may be represented as a set of matrices describing relationships between different nodes. This enables both rapid generation of related graphs as well as performing specific operations on the same.

Figure 4:
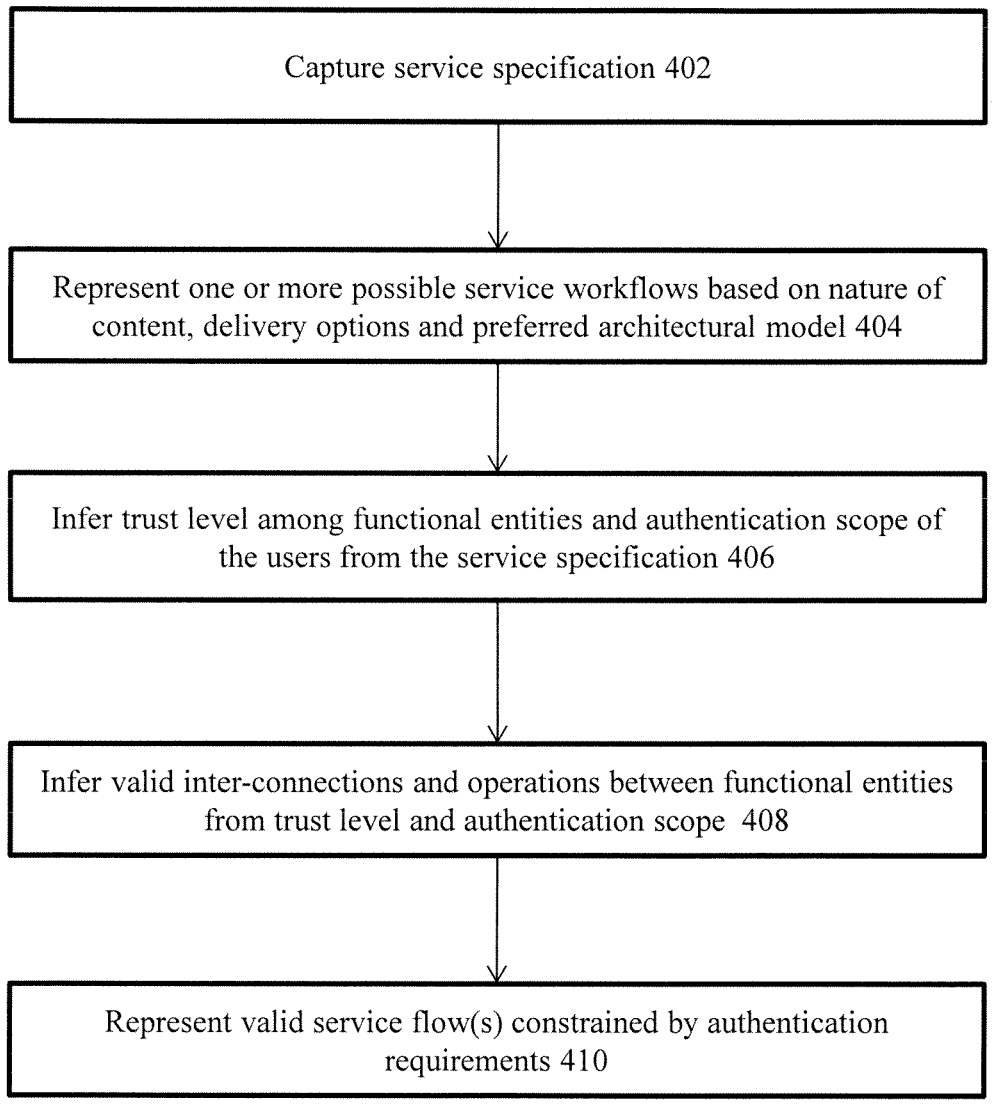
FIG. 4 is a flowchart, illustrating a method for determining and representing one or more authentication requirements for at least one valid service flow of one or more ICN based services, in accordance with an example of this technology.

FIG. 4 is a flowchart, illustrating a method for determining and representing one or more authentication requirements for at least one valid service flow of one or more ICN based services, in accordance with an example of this technology. Service specification is captured at 402. The service specification includes nature of content, trust level definitions between functional entities, delivery options, authentication scope definition, preferred architecture model and network service required.

Nature of content characterizes the content being delivered as part of the service. Key descriptive attributes of this include static/dynamic content, time sensitive/delay tolerant content. Static content refers to published content while dynamic content refers to content that may not yet exist but will be delivered to subscribers when it becomes available. Time sensitive or delay tolerant content refers to whether there is a stringent latency related to SLA for subscribers. Trust level definitions describe the level of trust that is acceptable between the different participatory domains. Trust levels help in inferring the set of operations that may be allowed to be performed by any domain participating in the delivery of this service. An exemplary trust level description where there is no trust established with the network may be as follows:

TABLE 1

|  | Service | Network | User |
| --- | --- | --- | --- |
| Service | Full | None | None |
| Network | NA | Full | None |
| User | None | Full | Full |

Table 1 is a worst case scenario where there is no trust between the different domains. In this case, all user requests need to be authenticated and serviced by the service provider. Further, all interactions between the user and service provider needs to be encrypted as it passes through the network. Network only performs the function of a forwarding engine. The different trust level that can exist are:

a) None (implies no trust)
    b) Full (meaning varies based on the entity. For example, fully trusting Network implies network can act as a complete proxy for the content service provider. The same in the case of user implies freely available service with no requirements for authentication)
    c) Partial (Attributes)—described in terms of authentication steps that can be performed within the domain. Possible steps include identity verification, scope authentication and/or rights validation.

Delivery options describe the delivery models that need to be supported for the service. The example of delivery options may include unicast, broadcast, multicast, synchronous or asynchronous. Authentication scope definition describes how the service requires the subscribers to be authenticated. This includes individual authentication and scope level authentication. In case of individual authentication each subscriber is verified for identity and permissions. On the other hand, in case of scope level authentication, subscribers who are the part of specific scopes are permitted. Here the task involves verifying subscriber identity and their validity within a scope. Optionally, the service provider can specify the architectural paradigm under which they expect the service to be operational. This is an optional value and the default is to assume that the service to operate over any architectural paradigm. The required network services can be derived based on the trust level, delivery options and preferred architecture models.

Referring back to FIG. 4, one or more possible service flows are represented based on nature of content, delivery options and preferred architectural model, as in step 404. All possible workflows are selected from the repository (314) and combine the same into a single directed graph. The nodes of the graph are the different functional entities that can participate in the service and the edges represent the interactions between the two entities. If there are no edges between the two nodes, it implies absence of interaction between the same. Thereafter, the trust level among functional entities and authentication scope of the users are inferred, as in step 406, and this information is used to infer validity of inter-connections between different functional entities as well as the operations that can be performed, as in step 408. This results in the re-generation of the directed graph with the specified authentication constraints which shows only the valid service flows, as in step 410. The service flows can also be represented as two dimensional matrices where an entry $a_{ij}$ describes the set of operations possible between entity i and j. the same is represented as a collection of operational verbs. Based on the participating entities and their valid connections, this technique also aggregates corresponding threat perceptions at each entity. This enables a formal analysis of any solution designed to address the authentication issue of ICN services.

The above mentioned description is presented to enable a person of ordinary skill in the art to make and use the invention and is provided in the context of the requirement for obtaining a patent. Various modifications to the preferred example will be readily apparent to those skilled in the art and the generic principles of this technology may be applied to other examples, and some features of this technology may be used without the corresponding use of other features. Accordingly, this technology is not intended to be limited to the example shown but is to be accorded the widest scope consistent with the principles and features described herein.

What is claimed is:

1. A method for determining and representing one or more authentication requirements for at least one valid service flow of one or more information centric network (ICN) based services, the method comprising:

capturing, by an authentication management computing device, nature of one or more contents to be delivered as a part of the one or more ICN based services, one or more trust relationships, one or more authentication scope definitions and one or more content delivery options from a input service specification;

representing, by the authentication management computing device, one or more possible service flows based on the nature of the one or more contents and the one or more content delivery options, wherein the one or more possible service flows are extracted from a repository;

inferring, by the authentication management computing device, a trust level between two or more functional entities involved in the one or more ICN based services and an authentication scope of one or more users from the one or more trust relationships and authentication scope definitions;

inferring, by the authentication management computing device, one or more valid inter-connections and operations between the two or more functional entities based on the trust level and authentication scope; and representing, by the authentication management computing device, the at least one valid service flow based on the one or more valid inter-connections and operations, wherein the at least one valid service flow is constrained by the one or more authentication requirements.

2. The method as claimed in claim 1 further comprises extracting, by the authentication management computing device, one or more threat vectors from the repository based on the one or more valid inter-connections and operations.

3. The method as claimed in claim 1, wherein the input service specification comprises a preferred architecture model under which the service is required to be operational.

4. The method as claimed in claim 1, wherein the two or more functional entities comprises one or more of service, network and the one or more users.

5. The method as claimed in claim 1, wherein the authentication scope comprises individual authentication and scope level authentication.

6. The method as claimed in claim 1, wherein the one or more possible service flows and the at least one valid service flow are represented by at least one of a directed graph or as two dimensional matrices.

7. The method as claimed in claim 1, wherein the one or more operations comprise one or more of publishing content description, publishing content, authorizing publication of description, authorizing publication of content, forwarding request, forwarding content, supplying content, authenticating scope, authenticating identity or authenticating rights.

8. An authentication management computing device comprising:

at least one processor;

at least one memory coupled to the processor configured to execute programmed instructions stored in the memory comprising:

capturing nature of one or more contents to be delivered as a part of the one or more ICN based services, one or more trust relationships, one or more authentication scope definitions and one or more content delivery options;

representing one or more possible service flows based on the nature of the one or more contents and the one or more content delivery options, wherein the one or more possible service flows are extracted from a repository;

inferring a trust level between two or more functional entities involved in the one or more ICN based services and an authentication scope of one or more users from the one or more trust relationships and authentication scope definitions;

inferring one or more valid inter-connections and operations between the two or more functional entities based on the trust level and authentication scope; and representing the at least one valid service flow based on the one or more valid inter-connections and operations, wherein the at least one valid service flow is constrained by the one or more authentication requirements.

9. The device as claimed in claim 8 wherein the processor is further configured to execute programmed instructions stored in the memory further comprising extracting one or more threat vectors from the repository based on the one or more valid inter-connections and operations.

10. The device as claimed in claim 8, wherein the input service specification comprises a preferred architecture model under which the service is required to be operational.

11. The device as claimed in claim 8, wherein the two or more functional entities comprises one or more of service, network and the one or more users.

12. The device as claimed in claim 8, wherein the authentication scope comprises individual authentication and scope level authentication.

13. The device as claimed in claim 8, wherein the one or more possible service flows and the at least one valid service flow are represented by at least one of a directed graph or as two dimensional matrices.

14. The device as claimed in claim 8, wherein the one or more operations comprise one or more of publishing content description, publishing content, authorizing publication of description, authorizing publication of content, forwarding request, forwarding content, supplying content, authenticating scope, authenticating identity or authenticating rights.

15. A non-transitory computer readable medium having stored thereon instructions for determining and representing one or more authentication requirements for at least one valid service flow of one or more information centric network (ICN) based services which when executed by a processor, causes the processor to perform steps comprising:

capturing nature of one or more contents to be delivered as a part of the one or more ICN based services, one or more trust relationships, one or more authentication scope definitions and one or more content delivery options from a input service specification;

representing one or more possible service flows based on the nature of the one or more contents and the one or more content delivery options, wherein the one or more possible service flows are extracted from a repository;

inferring a trust level between two or more functional entities involved in the one or more ICN based services and an authentication scope of one or more users from the one or more trust relationships and authentication scope definitions;

inferring one or more valid inter-connections and operations between the two or more functional entities based on the trust level and authentication scope; and representing the at least one valid service flow based on the one or more valid inter-connections and operations, wherein the at least one valid service flow is constrained by the one or more authentication requirements.

16. The medium as claimed in claim 15 further comprises extracting one or more threat vectors from the repository based on the one or more valid inter-connections and operations.

17. The medium as claimed in claim 15, wherein the input service specification comprises a preferred architecture model under which the service is required to be operational.

18. The medium as claimed in claim 15, wherein the two or more functional entities comprises one or more of service, network and the one or more users.

19. The medium as claimed in claim 15, wherein the authentication scope comprises individual authentication and scope level authentication.

20. The medium as claimed in claim 15, wherein the one or more possible service flows and the at least one valid service flow are represented by at least one of a directed graph or as two dimensional matrices.

21. The medium as claimed in claim 15, wherein the one or more operations comprise one or more of publishing content description, publishing content, authorizing publication of description, authorizing publication of content, forwarding request, forwarding content, supplying content, authenticating scope, authenticating identity or authenticating rights.

* * * * *